US012603859B2

(12) United States Patent
  Rout et al.

(10) Patent No.: US 12,603,859 B2
(45) Date of Patent: Apr. 14, 2026

(54) APPARATUS, METHOD, AND COMPUTER PROGRAM

(71) Applicant: Nokia Technologies Oy, Espoo (FI)

(72) Inventors: Bivudendu Pratap Rout, Karnataka (IN); Omar Elloumi, Palaiseau (FR); Shubhranshu Singh, Seeheim-Jugenheim (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 19 days.

(21) Appl. No.: 18/691,647

(22) PCT Filed: Sep. 16, 2021

(86) PCT No.: PCT/EP2021/075474
  § 371 (c)(1),
  (2) Date: Mar. 13, 2024

(87) PCT Pub. No.: WO2023/041159
  PCT Pub. Date: Mar. 23, 2023

(65) Prior Publication Data
  US 2024/0396863 A1     Nov. 28, 2024

(51) Int. Cl.
  H04L 61/2503     (2022.01)
  H04L 61/5007     (2022.01)
(52) U.S. Cl.
  CPC ...... H04L 61/2503 (2013.01); H04L 61/5007 (2022.05)
(58) Field of Classification Search
  CPC ............. H04L 61/2567; H04L 61/2585; H04L 61/2514; H04L 61/2575; H04L 61/2582; H04L 61/2591; H04L 61/2503
  See application file for complete search history.

(56) References Cited

U.S. PATENT DOCUMENTS 8,843,588 B2 * 9/2014 Flinck ................. H04L 67/2895
                                                              709/217
9,807,021 B2 10/2017 Jain et al.
          (Continued)

FOREIGN PATENT DOCUMENTS

WO     2020/231120 A1     11/2020
WO     2021/009166 A1     1/2021
          (Continued)

OTHER PUBLICATIONS

International Search Report issued by the European Patent Office acting as the International Searching Authority in relation to International Application No. PCT/EP2021/075474 dated Jun. 3, 2022 (5 pages).

(Continued)

*Primary Examiner* — Alex Tran
(74) *Attorney, Agent, or Firm* — Carter, DeLuca & Farrell LLP

(57)     ABSTRACT

An apparatus including at least one processor and at least one memory including computer code for one or more programs, the at least one memory and the computer code configured, with the at least one processor, to cause the apparatus at least to: receiving a user equipment internet protocol address allocated by a core network; receiving a network address translated user equipment internet protocol address allocated by a network address translation function; and mapping the user equipment internet protocol address allocated by the core network to the network address translated user equipment internet protocol address allocated by the network address translation function.

1 Claim, 12 Drawing Sheets

(56) References Cited

U.S. PATENT DOCUMENTS

| | | | | | |
|---|---|---|---|---|---|
| 10,097,510 | B2 * | 10/2018 | Agrawal | | H04L 61/2514 |
| 10,841,384 | B2 * | 11/2020 | Wang | | H04L 67/125 |
| 11,653,323 | B2 * | 5/2023 | Gupta | | H04W 60/04 |
| | | | | | 370/329 |
| 12,022,381 | B2 * | 6/2024 | Kim | | H04L 67/306 |
| 2015/0271135 | A1 | 9/2015 | Tseng et al. | | |
| 2020/0099659 | A1 | 3/2020 | Cometto et al. | | |
| 2021/0152516 | A1 | 5/2021 | Moreno et al. | | |
| 2022/0191650 | A1 * | 6/2022 | Kim | | H04W 4/20 |
| 2024/0298170 | A1 * | 9/2024 | Xu | | H04W 8/26 |
| 2024/0348575 | A1 * | 10/2024 | Kim | | H04L 61/4588 |

FOREIGN PATENT DOCUMENTS

| | | | | | |
|---|---|---|---|---|---|
| WO | 2021/026509 | A1 | 2/2021 | | |
| WO | WO-2021078936 | A1 * | 4/2021 | | H04L 61/4511 |

OTHER PUBLICATIONS

Written Opinion of the International Searching Authority issued by the European Patent Office acting as the International Searching Authority in relation to International Application No. PCT/EP2021/075474 dated Jun. 3, 2022 (7 pages).

"Multiple ECS Address coexistence and provision to 5GC and UE", SA WG2 Meeting #144E e-meeting, S2-2102736, vivo, Agenda Item: 8.3, Apr. 12-16, 2021, 2 pages.

"3rd Generation Partnership Project; Technical Specification Group Services and System Aspects; Architecture for enabling Edge Applications; (Release 17)", 3GPP TS 23.558 V2.0.0, Mar. 2021, pp. 1-141.

"UE id retrieval for the EEC", 3GPP TSG-SA WG6 Meeting #41-e, S6-210091, Ericsson, Agenda item: 7.6, Jan. 18-26, 2021, 6 pages.

"3rd Generation Partnership Project; Technical Specification Group Services and System Aspects; Study on application architecture for enabling Edge Applications; (Release 17)", 3GPP TR 23.758 V17.0.0, Dec. 2019, pp. 1-113.

"3rd Generation Partnership Project; Technical Specification Group Services and System Aspects; Architecture for enabling Edge Applications; (Release 17)", 3GPP TS 23.558 V17.0.0, Jun. 2021, pp. 1-157.

Boulton et al., "NAT Traversal Practices for Client-Server SIP", RFC 6314, Internet Engineering Task Force (IETF), Jul. 2011, pp. 1-60.

"UE ID API & UE IP address to GPSI translation", 3GPP TSG-SA WG6 Meeting #39-bis-e, S6-201814, Samsung Electronics, Oct. 12-20, 2020, pp. 1-8.

"UE Identifier API", 3GPP TSG-SA WG6 Meeting #39-bis-e, S6-201966, Samsung Electronics, Agenda item: 7.6, Oct. 12-20, 4 pages.

"Impacts of EdgeApp to CT WGs", 3GPP TSG CT WG1 Meeting #125-e, C1-205090, Samsung, Agenda item: 17.1.2, Aug. 20-28, 2020, 2 pages.

"3rd Generation Partnership Project; Technical Specification Group Services and System Aspects; Study on Enhanced architecture for enabling Edge Applications; (Release 18)", 3GPP TR 23.700-98 V1.1.1, Jul. 2022, 158 pages.

* cited by examiner

900 EES may receive a UE IP address allocated by a CN

902 EES may receive a NATed UE IP address allocated by a NAT function

904 EES may map the UE IP address allocated by the CN to the NATed UE IP address allocated by the NAT function

1000 EES may send, to an EES, a NATed UE IP address allocated by a NAT function

Fig. 10

1100 UE may send, to an EES or an EAS, a UE IP address allocated by a CN

APPARATUS, METHOD, AND COMPUTER PROGRAM

CROSS-REFERENCE TO RELATED APPLICATIONS

This application is a national phase entry under 35 U.S.C. 371 of PCT International Application No. PCT/EP2021/075474 filed Sep. 16, 2021, the disclosure of this application is expressly incorporated herein by reference in its entirety.

FIELD OF THE DISCLOSURE

The present disclosure relates to an apparatus, a method, and a computer program for maintaining a mapping between a user equipment internet protocol address allocated by a core network and a network address translated user equipment internet protocol address allocated by a network address translation function.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: receiving a user equipment internet protocol address allocated by a core network; receiving a network address translated user equipment internet protocol address allocated by a network address translation function; and mapping the user equipment internet protocol address allocated by the core network to the network address translated user equipment internet protocol address allocated by the network address translation function.

The network address translation function may be hosted by an edge network or hosted between the core network and an edge network.

The apparatus may comprise means for: receiving, from the user equipment, an application session identifier with the user equipment internet protocol address allocated by the core network; and receiving, from an edge application server, the application session identifier with the network address translated user equipment internet protocol address allocated by the network address translation function.

The application session identifier and the user equipment internet protocol address allocated by the core network may be received over an edge-1 interface.

The application session identifier and the network address translated user equipment internet protocol address allocated by the network address translation function may be received over an edge-3 interface.

The apparatus may comprise means for: receiving, from an edge application server, the user equipment internet protocol address allocated by a core network with the network address translated user equipment internet protocol address allocated by the network address translation function.

The user equipment internet protocol address allocated by the core network with the network address translated user equipment internet protocol address allocated by the network address translation function may be received over an edge-3 interface.

The apparatus may comprise means for: receiving a request for a service provided by the core network, from the edge application server, comprising the network address translated user equipment internet protocol address allocated by the network address translation function; translating the request for a service provided by the core network comprising the network address translated user equipment internet protocol address allocated by the network address translation function into a request for the service provided by the core network comprising the user equipment internet protocol address allocated by the core network; and sending, to the core network, the request for the service provided by the core network comprising the user equipment internet protocol address allocated by the core network.

The request comprising the user equipment internet protocol address allocated by the core network may be sent over an edge-2 interface.

According to an aspect there is provided an apparatus comprising at least one processor and at least one memory including computer code for one or more programs, the at least one memory and the computer code configured, with the at least one processor, to cause the apparatus at least to: receive a user equipment internet protocol address allocated by a core network; receive a network address translated user equipment internet protocol address allocated by a network address translation function; and map the user equipment internet protocol address allocated by the core network to the network address translated user equipment internet protocol address allocated by the network address translation function.

The network address translation function may be hosted by an edge network or hosted between the core network and an edge network.

The at least one memory and the computer code may be configured, with the at least one processor, to cause the apparatus at least to: receive, from the user equipment, an application session identifier with the user equipment internet protocol address allocated by the core network; and receive, from an edge application server, the application session identifier with the network address translated user equipment internet protocol address allocated by the network address translation function.

The application session identifier and the user equipment internet protocol address allocated by the core network may be received over an edge-1 interface.

The application session identifier and the network address translated user equipment internet protocol address allocated by the network address translation function may be received over an edge-3 interface.

The at least one memory and the computer code may configured, with the at least one processor, to cause the apparatus at least to: receive, from an edge application server, the user equipment internet protocol address allocated by a core network with the network address translated user equipment internet protocol address allocated by the network address translation function.

The user equipment internet protocol address allocated by the core network with the network address translated user equipment internet protocol address allocated by the network address translation function may be received over an edge-3 interface.

The at least one memory and the computer code may be configured, with the at least one processor, to cause the apparatus at least to: receive a request for a service provided by the core network, from the edge application server, comprising the network address translated user equipment internet protocol address allocated by the network address translation function; translate the request for a service provided by the core network comprising the network address translated user equipment internet protocol address allocated by the network address translation function into a request for the service provided by the core network comprising the user equipment internet protocol address allocated by the core network; and send, to the core network, the request for the service provided by the core network comprising the user equipment internet protocol address allocated by the core network.

The request comprising the user equipment internet protocol address allocated by the core network may be sent over an edge-2 interface.

According to an aspect there is provided an apparatus comprising circuitry configured to: receive a user equipment internet protocol address allocated by a core network; receive a network address translated user equipment internet protocol address allocated by a network address translation function; and map the user equipment internet protocol address allocated by the core network to the network address translated user equipment internet protocol address allocated by the network address translation function.

The network address translation function may be hosted by an edge network or hosted between the core network and an edge network.

The apparatus may comprise circuitry configured to: receive, from the user equipment, an application session identifier with the user equipment internet protocol address allocated by the core network; and receive, from an edge application server, the application session identifier with the network address translated user equipment internet protocol address allocated by the network address translation function.

The application session identifier and the user equipment internet protocol address allocated by the core network may be received over an edge-1 interface.

The application session identifier and the network address translated user equipment internet protocol address allocated by the network address translation function may be received over an edge-3 interface.

The apparatus may comprise circuitry configured to: receive, from an edge application server, the user equipment internet protocol address allocated by a core network with the network address translated user equipment internet protocol address allocated by the network address translation function.

The user equipment internet protocol address allocated by the core network with the network address translated user equipment internet protocol address allocated by the network address translation function may be received over an edge-3 interface.

The apparatus may comprise circuitry configured to: receive a request for a service provided by the core network, from the edge application server, comprising the network address translated user equipment internet protocol address allocated by the network address translation function; translate the request for a service provided by the core network comprising the network address translated user equipment internet protocol address allocated by the network address translation function into a request for the service provided by the core network comprising the user equipment internet protocol address allocated by the core network; and send, to the core network, the request for the service provided by the core network comprising the user equipment internet protocol address allocated by the core network.

The request comprising the user equipment internet protocol address allocated by the core network may be sent over an edge-2 interface.

According to an aspect there is provided a method comprising: receiving a user equipment internet protocol address allocated by a core network; receiving a network address translated user equipment internet protocol address allocated by a network address translation function; and mapping the user equipment internet protocol address allocated by the core network to the network address translated user equipment internet protocol address allocated by the network address translation function.

The network address translation function may be hosted by an edge network or hosted between the core network and an edge network.

The method may comprise: receiving, from the user equipment, an application session identifier with the user equipment internet protocol address allocated by the core network; and receiving, from an edge application server, the application session identifier with the network address translated user equipment internet protocol address allocated by the network address translation function.

The application session identifier and the user equipment internet protocol address allocated by the core network may be received over an edge-1 interface.

The application session identifier and the network address translated user equipment internet protocol address allocated by the network address translation function may be received over an edge-3 interface.

The method may comprise: receiving, from an edge application server, the user equipment internet protocol address allocated by a core network with the network address translated user equipment internet protocol address allocated by the network address translation function.

The user equipment internet protocol address allocated by the core network with the network address translated user equipment internet protocol address allocated by the network address translation function may be received over an edge-3 interface.

The method may comprise: receiving a request for a service provided by the core network, from the edge application server, comprising the network address translated user equipment internet protocol address allocated by the network address translation function; translating the request for a service provided by the core network comprising the network address translated user equipment internet protocol address allocated by the network address translation function into a request for the service provided by the core network comprising the user equipment internet protocol address allocated by the core network; and sending, to the core network, the request for the service provided by the core network comprising the user equipment internet protocol address allocated by the core network.

The request comprising the user equipment internet protocol address allocated by the core network may be sent over an edge-2 interface.

According to an aspect there is provided a computer program comprising computer executable code which when run on at least one processor is configured to: receive a user equipment internet protocol address allocated by a core network; receive a network address translated user equipment internet protocol address allocated by a network address translation function; and map the user equipment internet protocol address allocated by the core network to the network address translated user equipment internet protocol address allocated by the network address translation function.

The network address translation function may be hosted by an edge network or hosted between the core network and an edge network.

The computer program may comprise computer executable code which when run on at least one processor is configured to: receive, from the user equipment, an application session identifier with the user equipment internet protocol address allocated by the core network; and receive, from an edge application server, the application session identifier with the network address translated user equipment internet protocol address allocated by the network address translation function.

The application session identifier and the user equipment internet protocol address allocated by the core network may be received over an edge-1 interface.

The application session identifier and the network address translated user equipment internet protocol address allocated by the network address translation function may be received over an edge-3 interface.

The computer program may comprise computer executable code which when run on at least one processor is configured to: receive, from an edge application server, the user equipment internet protocol address allocated by a core network with the network address translated user equipment internet protocol address allocated by the network address translation function.

The user equipment internet protocol address allocated by the core network with the network address translated user equipment internet protocol address allocated by the network address translation function may be received over an edge-3 interface.

The computer program may comprise computer executable code which when run on at least one processor is configured to: receive a request for a service provided by the core network, from the edge application server, comprising the network address translated user equipment internet protocol address allocated by the network address translation function; translate the request for a service provided by the core network comprising the network address translated user equipment internet protocol address allocated by the network address translation function into a request for the service provided by the core network comprising the user equipment internet protocol address allocated by the core network; and send, to the core network, the request for the service provided by the core network comprising the user equipment internet protocol address allocated by the core network.

The request comprising the user equipment internet protocol address allocated by the core network may be sent over an edge-2 interface.

According to an aspect there is provided an apparatus comprising means for: sending, to an edge enabler server, a network address translated user equipment internet protocol address allocated by a network address translation function.

The network address translated user equipment internet protocol address allocated by the network address translation function may be sent with a user equipment internet protocol address allocated by a core network.

the network address translation function may be sent with a user equipment internet protocol address allocated by a core network over an edge-3 interface.

The apparatus may comprise means for: receiving, from the user equipment, the network address translated user equipment internet protocol address allocated by the network address translation function and/or the user equipment internet protocol address allocated by the core network.

The network address translated user equipment internet protocol address allocated by the network address translation function may be received over a dedicated application layer signalling.

The network address translated user equipment internet protocol address allocated by the network address translation function may be sent with an application session identifier.

The network address translated user equipment internet protocol address allocated by the network address translation function may be sent with an application session identifier over an edge-3 interface.

The apparatus may comprise means for: sending a request for a service provided by the core network, to the edge enabler server, comprising the network address translated user equipment internet protocol address allocated by the network address translation function.

According to an aspect there is provided an apparatus comprising at least one processor and at least one memory including computer code for one or more programs, the at least one memory and the computer code configured, with the at least one processor, to cause the apparatus at least to: send, to an edge enabler server, a network address translated user equipment internet protocol address allocated by a network address translation function.

The network address translated user equipment internet protocol address allocated by the network address translation function may be sent with a user equipment internet protocol address allocated by a core network.

The network address translated user equipment internet protocol address allocated by the network address translation function may be sent with a user equipment internet protocol address allocated by a core network over an edge-3 interface.

The at least one memory and the computer code may be configured, with the at least one processor, to cause the apparatus at least to: receive, from the user equipment, the network address translated user equipment internet protocol address allocated by the network address translation function and/or the user equipment internet protocol address allocated by the core network.

The network address translated user equipment internet protocol address allocated by the network address translation function may be received over a dedicated application layer signalling.

The network address translated user equipment internet protocol address allocated by the network address translation function may be sent with an application session identifier.

The network address translated user equipment internet protocol address allocated by the network address translation function may be sent with an application session identifier over an edge-3 interface.

The at least one memory and the computer code may be configured, with the at least one processor, to cause the apparatus at least to: send a request for a service provided by the core network, to the edge enabler server, comprising the network address translated user equipment internet protocol address allocated by the network address translation function.

According to an aspect there is provided an apparatus comprising circuitry configured to: send, to an edge enabler server, a network address translated user equipment internet protocol address allocated by a network address translation function.

The network address translated user equipment internet protocol address allocated by the network address translation function may be sent with a user equipment internet protocol address allocated by a core network.

The network address translated user equipment internet protocol address allocated by the network address translation function may be sent with a user equipment internet protocol address allocated by a core network over an edge-3 interface.

The apparatus may comprise circuitry configured to: receive, from the user equipment, the network address translated user equipment internet protocol address allocated by the network address translation function and/or the user equipment internet protocol address allocated by the core network.

The network address translated user equipment internet protocol address allocated by the network address translation function may be received over a dedicated application layer signalling.

The network address translated user equipment internet protocol address allocated by the network address translation function may be sent with an application session identifier.

The network address translated user equipment internet protocol address allocated by the network address translation function may be sent with an application session identifier over an edge-3 interface.

The apparatus may comprise circuitry configured to: send a request for a service provided by the core network, to the edge enabler server, comprising the network address translated user equipment internet protocol address allocated by the network address translation function.

According to an aspect there is provided a method comprising: sending, to an edge enabler server, a network address translated user equipment internet protocol address allocated by a network address translation function.

The network address translated user equipment internet protocol address allocated by the network address translation function may be sent with a user equipment internet protocol address allocated by a core network.

The network address translated user equipment internet protocol address allocated by the network address translation function may be sent with a user equipment internet protocol address allocated by a core network over an edge-3 interface.

The method may comprise: receiving, from the user equipment, the network address translated user equipment internet protocol address allocated by the network address translation function and/or the user equipment internet protocol address allocated by the core network.

The network address translated user equipment internet protocol address allocated by the network address translation function may be received over a dedicated application layer signalling.

The network address translated user equipment internet protocol address allocated by the network address translation function may be sent with an application session identifier.

The network address translated user equipment internet protocol address allocated by the network address translation function may be sent with an application session identifier over an edge-3 interface.

The method may comprise: sending a request for a service provided by the core network, to the edge enabler server, comprising the network address translated user equipment internet protocol address allocated by the network address translation function.

According to an aspect there is provided a computer program comprising computer executable code which when run on at least one processor is configured to: send, to an edge enabler server, a network address translated user equipment internet protocol address allocated by a network address translation function.

The network address translated user equipment internet protocol address allocated by the network address translation function may be sent with a user equipment internet protocol address allocated by a core network.

The network address translated user equipment internet protocol address allocated by the network address translation function may be sent with a user equipment internet protocol address allocated by a core network over an edge-3 interface.

The computer program may comprise computer executable code which when run on at least one processor is configured to: receive, from the user equipment, the network address translated user equipment internet protocol address allocated by the network address translation function and/or the user equipment internet protocol address allocated by the core network.

The network address translated user equipment internet protocol address allocated by the network address translation function may be received over a dedicated application layer signalling.

The network address translated user equipment internet protocol address allocated by the network address translation function may be sent with an application session identifier.

The network address translated user equipment internet protocol address allocated by the network address translation function may be sent with an application session identifier over an edge-3 interface.

The computer program may comprise computer executable code which when run on at least one processor is configured to: send a request for a service provided by the core network, to the edge enabler server, comprising the network address translated user equipment internet protocol address allocated by the network address translation function.

According to an aspect there is provided an apparatus comprising means for: send, to an edge application server or an edge enabler server, a user equipment internet protocol address allocated by a core network.

The apparatus may comprise means for: sending, to an edge enabler server, the user equipment internet protocol address allocated by the core network with an application session identifier.

The apparatus may comprise an application client and an edge enabler client. Sending the user equipment internet protocol address allocated by the core network with an application session identifier may comprise: sending, by the application client to the edge enabler client, an instruction to send the user equipment internet protocol address allocated by the core network with the application session identifier; and sending, by the edge enabler client to the edge enabler server, the user equipment internet protocol address allocated by the core network with the application session identifier.

The instruction to send the user equipment internet protocol address allocated by the core network with the application session identifier may be sent over an edge-5 interface.

The user equipment internet protocol address allocated by the core network with the application session identifier may be sent to the edge enabler server over an edge-1 interface.

According to an aspect there is provided an apparatus comprising at least one processor and at least one memory including computer code for one or more programs, the at least one memory and the computer code configured, with the at least one processor, to cause the apparatus at least to: send, to an edge application server or an edge enabler server, a user equipment internet protocol address allocated by a core network.

The at least one memory and the computer code may be configured, with the at least one processor, to cause the apparatus at least to: send, to an edge enabler server, the user equipment internet protocol address allocated by the core network with an application session identifier.

The apparatus may comprise an application client and an edge enabler client. Sending the user equipment internet protocol address allocated by the core network with an application session identifier may comprise: sending, by the application client to the edge enabler client, an instruction to send the user equipment internet protocol address allocated by the core network with the application session identifier; and sending, by the edge enabler client to the edge enabler server, the user equipment internet protocol address allocated by the core network with the application session identifier.

The instruction to send the user equipment internet protocol address allocated by the core network with the application session identifier may be sent over an edge-5 interface.

The user equipment internet protocol address allocated by the core network with the application session identifier may be sent to the edge enabler server over an edge-1 interface.

According to an aspect there is provided an apparatus comprising circuitry configured to: send, to an edge application server or an edge enabler server, a user equipment internet protocol address allocated by a core network.

The apparatus may comprise circuitry configured to: send, to an edge enabler server, the user equipment internet protocol address allocated by the core network with an application session identifier.

The apparatus may comprise an application client and an edge enabler client. Sending the user equipment internet protocol address allocated by the core network with an application session identifier may comprise: sending, by the application client to the edge enabler client, an instruction to send the user equipment internet protocol address allocated by the core network with the application session identifier; and sending, by the edge enabler client to the edge enabler server, the user equipment internet protocol address allocated by the core network with the application session identifier.

The instruction to send the user equipment internet protocol address allocated by the core network with the application session identifier may be sent over an edge-5 interface.

The user equipment internet protocol address allocated by the core network with the application session identifier may be sent to the edge enabler server over an edge-1 interface.

According to an aspect there is provided a method comprising: send, to an edge application server or an edge enabler server, a user equipment internet protocol address allocated by a core network.

The method may be performed by an apparatus.

The method may comprise means for: sending, to an edge enabler server, the user equipment internet protocol address allocated by the core network with an application session identifier.

The apparatus may comprise an application client and an edge enabler client. Sending the user equipment internet protocol address allocated by the core network with an application session identifier may comprise: sending, by the application client to the edge enabler client, an instruction to send the user equipment internet protocol address allocated by the core network with the application session identifier; and sending, by the edge enabler client to the edge enabler server, the user equipment internet protocol address allocated by the core network with the application session identifier.

The instruction to send the user equipment internet protocol address allocated by the core network with the application session identifier may be sent over an edge-5 interface.

The user equipment internet protocol address allocated by the core network with the application session identifier may be sent to the edge enabler server over an edge-1 interface.

According to an aspect there is provided a computer program comprising computer executable code which when run on at least one processor is configured to: send, to an edge application server or an edge enabler server, a user equipment internet protocol address allocated by a core network.

The at least one processor may be part of an apparatus.

The computer program may comprise computer executable code which when run on at least one processor is configured to: send, to an edge enabler server, the user equipment internet protocol address allocated by the core network with an application session identifier.

The apparatus may comprise an application client and an edge enabler client. Sending the user equipment internet protocol address allocated by the core network with an application session identifier may comprise: sending, by the application client to the edge enabler client, an instruction to send the user equipment internet protocol address allocated by the core network with the application session identifier; and sending, by the edge enabler client to the edge enabler server, the user equipment internet protocol address allocated by the core network with the application session identifier.

The instruction to send the user equipment internet protocol address allocated by the core network with the application session identifier may be sent over an edge-5 interface.

The user equipment internet protocol address allocated by the core network with the application session identifier may be sent to the edge enabler server over an edge-1 interface.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access and Mobility Management Function
API: Application Protocol Interface
BS: Base Station
CU: Centralized Unit
DL: Downlink
DU: Distributed Unit
EAS: Edge Application Server
ECS: Edge Configuration Server
EES: Edge Enabler Server
gNB: gNodeB
GSM: Global System for Mobile communication
HSS: Home Subscriber Server
IoT: Internet of Things
LTE: Long Term Evolution
MAC: Medium Access Control
MS: Mobile Station
MTC: Machine Type Communication
NAT: Network Address Translation
NEF: Network Exposure Function
NF: Network Function
NR: New Radio
NRF: Network Repository Function
PDU: Packet Data Unit
RAM: Random Access Memory
(R)AN: (Radio) Access Network
ROM: Read Only Memory
SMF: Session Management Function
TR: Technical Report
TS: Technical Specification
UE: User Equipment
UMTS: Universal Mobile Telecommunication System
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 10 shows a block diagram of a method for enabling an edge enabler server to maintain mapping between a user equipment internet protocol address allocated by a 5GC and a network address translated user equipment internet protocol address allocated by a network address translation function performed by an edge application server;

FIG. 11 shows a block diagram of a method for enabling an edge enabler server to maintain mapping between a user equipment internet protocol address allocated by a 5GC and a network address translated user equipment internet protocol address allocated by a network address translation function performed by a user equipment; and FIG. 12 shows a schematic representation of a non-volatile memory medium storing instructions which when executed by a processor allow a processor to perform one or more of the steps of the methods of FIGS. 9 to 11.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
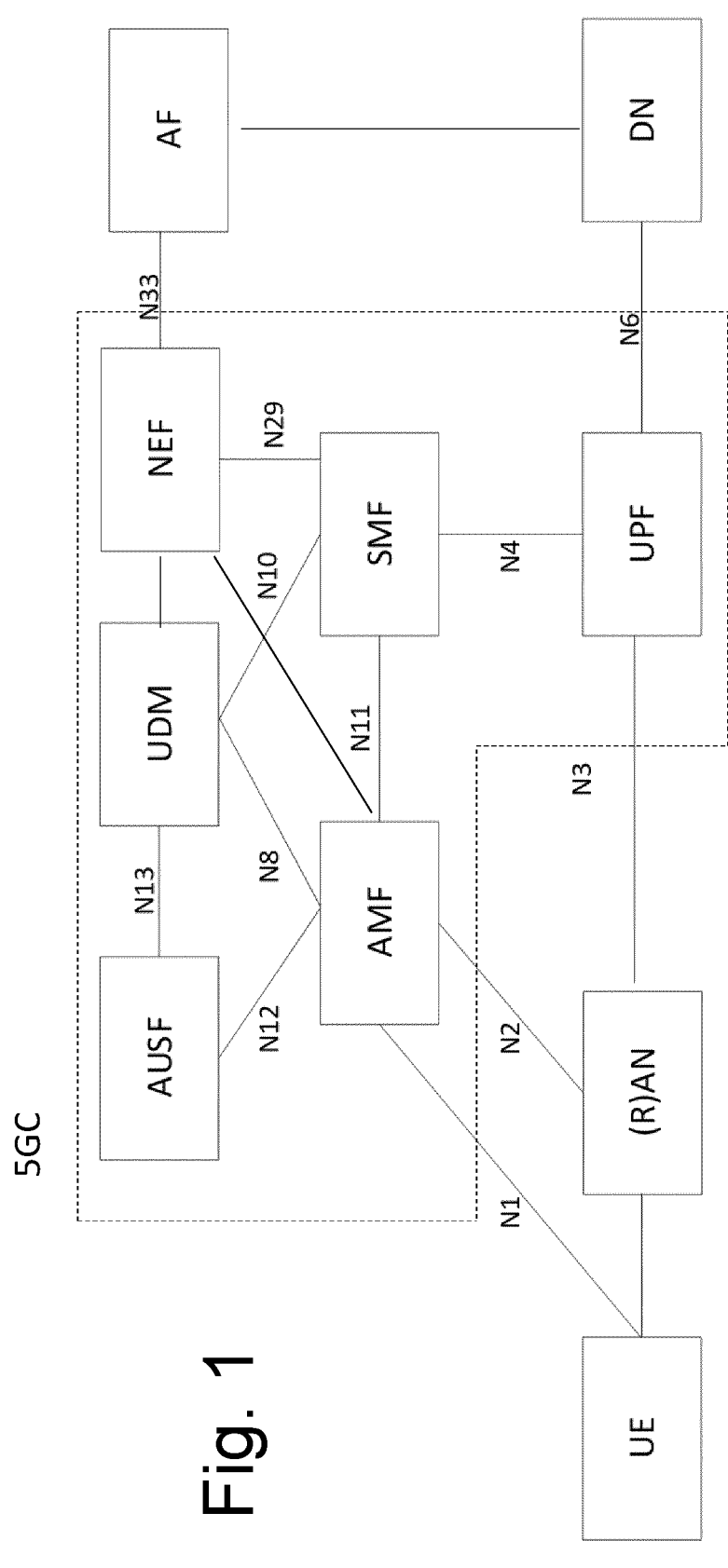
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

The application function may comprise one or more of an edge application server (EAS), an edge enabler server (EES) and edge configuration server (ECS).

The one or more DNs may comprise one or more edge networks.

Figure 2:
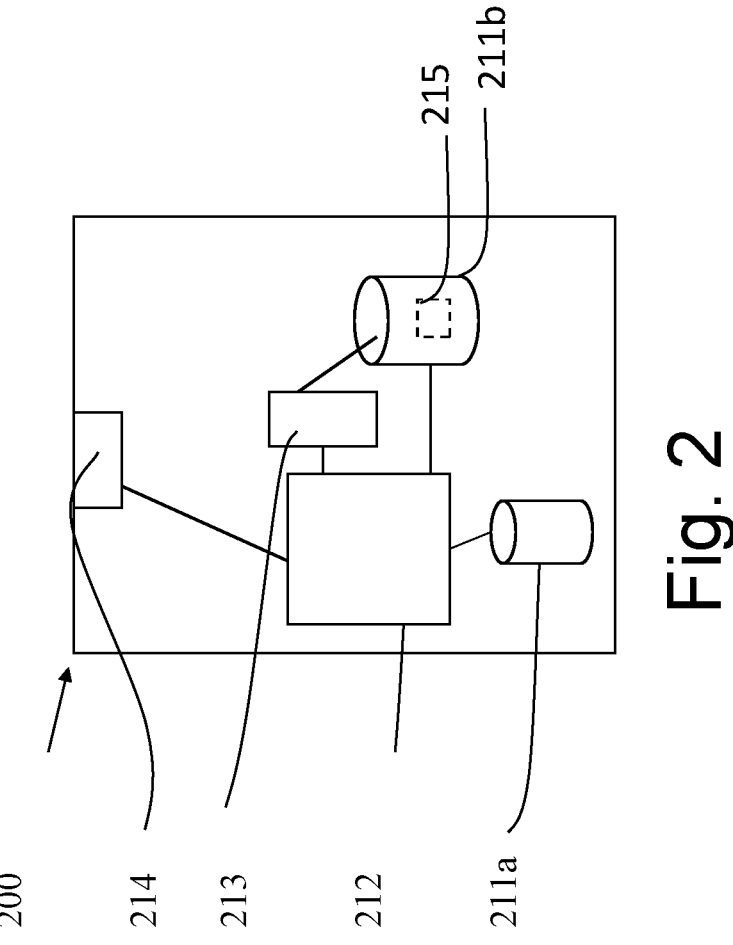
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
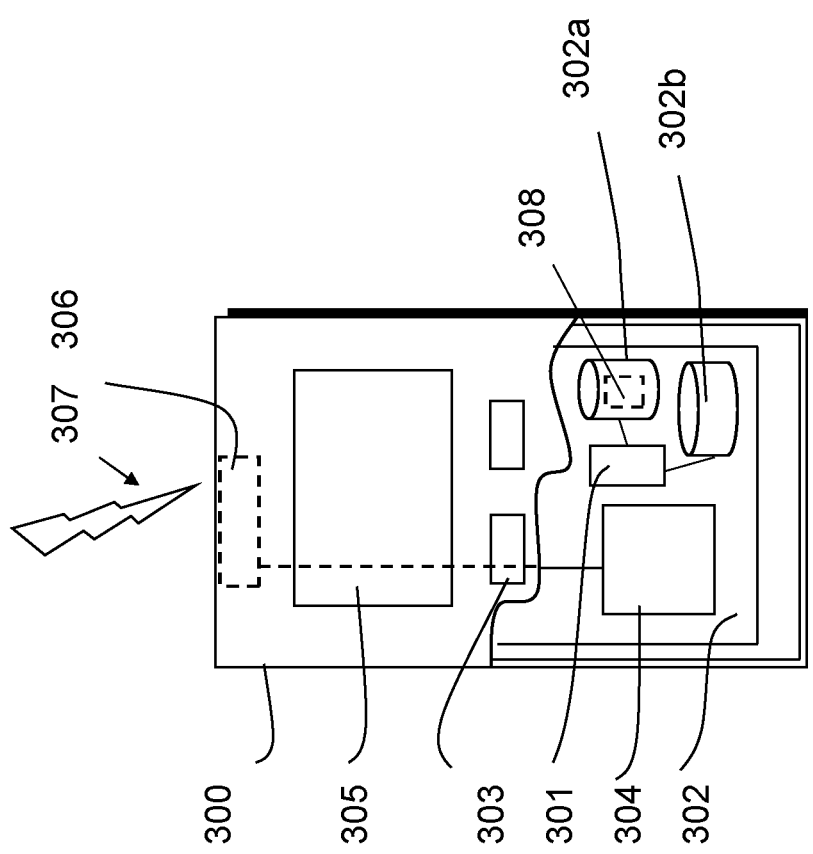
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspects of this disclosure relate to interactions between an edge enabler server (EES) and an edge application server for a UE identifier application programming interface (API)

Figure 4:
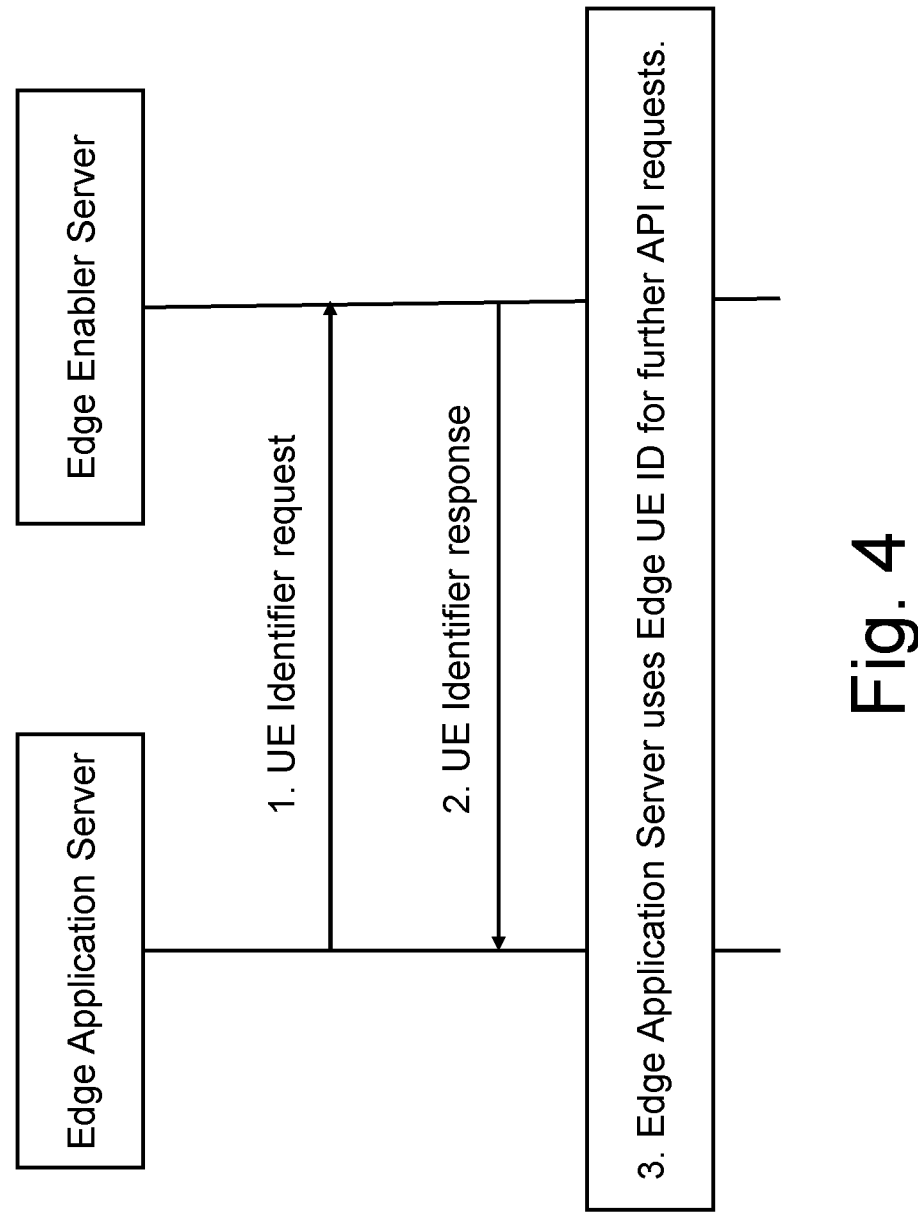
FIG. 4 shows a signaling diagram illustrating interactions between an edge enabler server and the edge application server for a user equipment identifier application programming interface (as per FIG. 8.6.5.2-1 of 3GPP TS 23.758 v17.0.0)
Figure 7:
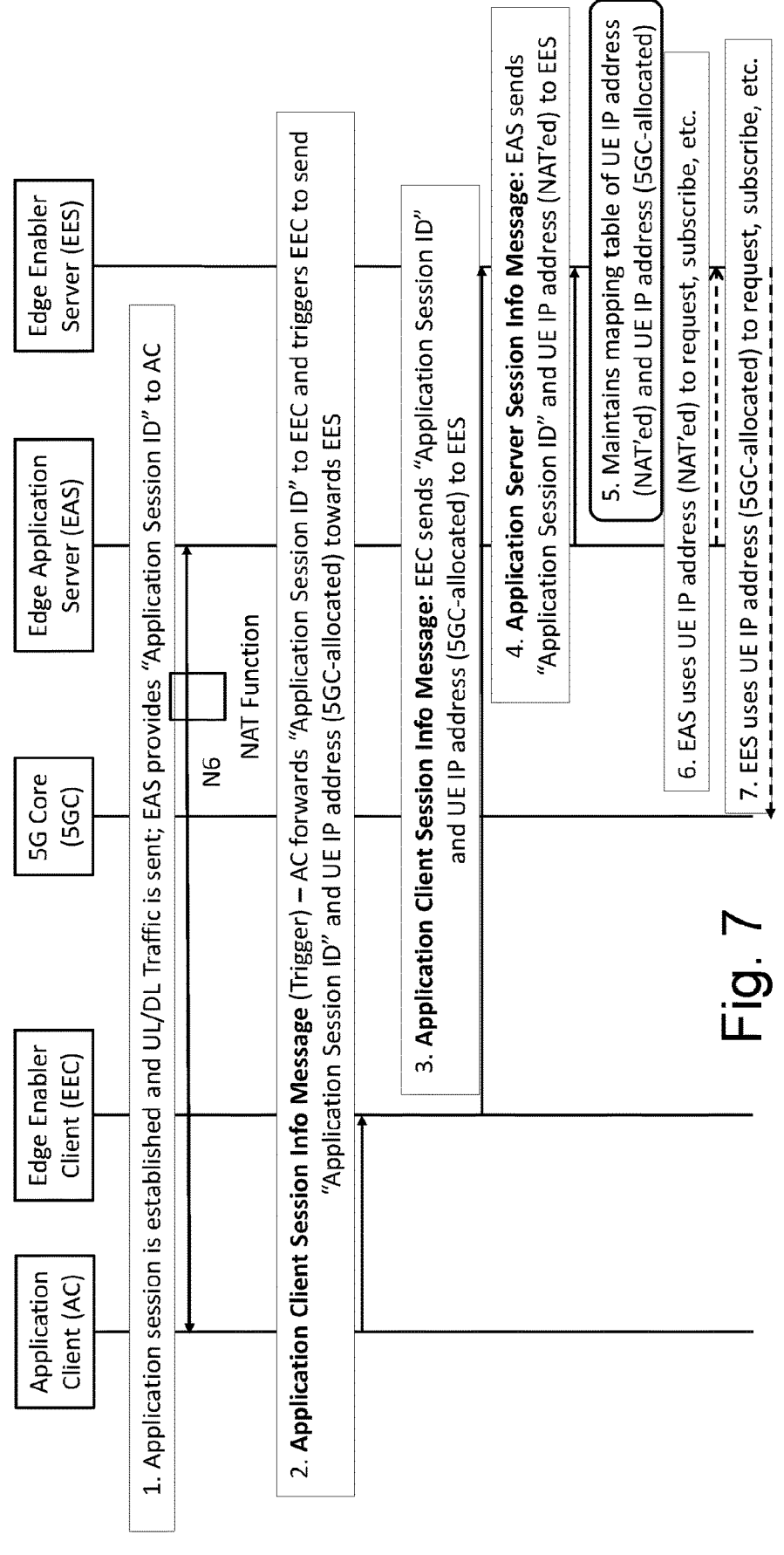
FIG. 7 shows a signaling diagram illustrating a process for enabling an edge enabler server to maintain mapping between a user equipment internet protocol address allocated by a 5GC and a network address translated user equipment internet protocol address allocated by a network address translation function.

Section 7.5.1.2 Procedure of TR 23.758 v17.0.0 reads as follows. FIG. 7.5.1.2-1: Solution 5-UE Identifier API of TR 23.758 v17.0.0 is illustrated on FIG. 4.

Pre-Conditions

1. The Edge Application Server is authorized to discover and to use UE Identifier API provided by the Edge Enabler Server;
2. The Edge Enabler Server is able to determine the Edge UE ID based on the user information received from the Edge Application; and
3. User and the Edge Application Server has made consent to expose user information.
   1. The Edge Application Server requests UE Identifier API (User information, Identifier of Edge Application Server) from the Edge Enabler Server. The User information can be a form of ACR (Anonymous Customer Reference, see OMA-TS-REST_N-etAPI_ACR), Edge Application Server user ID, or IP address of the Application Client, if available.

NOTE 1: This solution assumes that the IP address provided by the Edge Application Server is not NAT'ed from the PDN-GW at the user plane.

2. The Edge Enabler Server determines the UE based on the received user information in the step 1.

If the Edge Enabler Server has retrieved user information (e.g. ACR or IP address) for the UE during the authorization procedure, the Edge Enabler Server can determine the UE for the request. The Edge Enabler Server may query 3GPP Network to retrieve GPSI corresponding to the user information. The GPSI is used when the Edge Enabler Server relies on the T8 APIs as specified in 3GPP TS 29.122 [5] for capability exposure API(s) over EDGE-3.

NOTE 2: It is assumed that UE subscription information in 3GPP system includes the GPSI (Generic Public Subscription Identifier, as specified in 3GPP TS 23.501 [2]) for Edge Computing Service.

After determining the UE, the Edge Enabler Server responds to the Edge Application Server including the GPSI as an Edge UE ID.

Editor's Note: It is FFS whether the Edge Enabler Server allocates different Edge UE ID per Edge Application Server due to privacy reason. (e.g., hiding UE identifier used for an Edge Application Server to other Edge Applications)

3. The Edge Application Server uses the Edge UE ID received in the step 2 for further capability exposure API(s) provided by the Edge Enabler Server.

The Edge Enabler Server can update the Edge UE ID to the Edge Application Server if the Edge UE ID has been changed due to privacy reason (e.g., change of GPSI). The Edge Enabler Server can purge the Edge UE ID from the Edge Application Server if there is no need to support the Edge UE ID for capability exposure API(s)".

An application session may be established between a UE and the EAS. The application session may comprise IP flows where the UE is identified by a UE IP address. The EAS may send a request for a service for the UE to a 5GC (e.g. a request to subscribe to some events for the UE—these event may be reported via a NEF). The request may comprise the UE IP address.

An issue may arise when network address translation (NAT) is performed by a NAT function hosted in an edge network or hosted between the 5GC and an edge network. In such scenario, the request may comprise a UE IP address allocated by the NAT function instead of a UE IP address allocated by the 5GC.

However, the 5GC may not be aware that NAT is performed by a NAT function hosted at an edge network or hosted between the 5GC and an edge network and therefore the 5GC may not be aware the request may comprise a UE IP address allocated by the NAT function instead of a UE IP address allocated by the 5GC. As a result, the 5GC may not be able to map the UE IP address allocated by the NAT function to the UE IP address allocated by the 5GC. The 5GC may not be able to derive the UE identified by the UE IP address allocated by the NAT function.

Multiple approaches have been discussed in relation to this issue. However, most of these approaches considers scenarios where the NAT function is hosted at the 5GC or at the at N6 interface (between UPF and DN). These approaches do not consider scenario where the NAT function is hosted at the edge network. In these approaches, the 5GC (e.g. NEF) may be able to derive the UE identified by the UE IP address allocated by the NAT function S2-2102736 submitted to SA2 on Apr. 12-Apr. 16, 2021 meeting is directed to this issue and reads as follows.

"As described in TS 23.558 [5], the Edge Configuration Server can be deployed in the MNO domain or can be deployed in a 3rd party domain by a service provider. If the ECS is deployed in a 3rd party domain by a service provider, a 3rd party AF can use Nnef_ParameterProvision to provide, update, or delete ECS Address Configuration Information for an individual UE (See TS 23.502 [3], clause 4.15.6.2).

When the AF uses Nnef_ParameterProvision to send a new ECS Address Configuration Information to the UDM for a UE (e.g. because on Application layer activity, change of UE location, etc.), the UDM may notify the SMF of the updated ECS Address Information and the new ECS Address Configuration Information will be sent to the UE in a PDU Session Modification procedure.

In order to assist both 5GC and UE to distinguish ECS address provided by different providers, the 3rd party AF provides both ECS address and other relation parameters (the relation parameters can either in ECS Address Configuration Information or independent of ECS Address Configuration Information) to 5GC and UE. The relation parameters include address provider related (ECS Provider and ECS ID) parameters and target consumer related (EEC ID, APP ID, AC ID and etc).

NOTE: The 3rd party AF registers its available NF profile to the NRF. A UE Application is configured/provisioned with the address of the AF. The UE Application establishes a user plane connection to the 3rd party AF which is out of scope of 3GPP and provides UE IP address. The 3rd party AF triggers event exposure in SMF and UDM via NEF using UE IP address for obtaining the GPSI and maintaining the mapping table between UE IP address and GPSI".

S2-2102736 does not provide techniques for enabling an ECS to maintain a mapping between a UE IP address allocated by the 5GC and a NATed UE IP address allocated by a NAT function.

One or more aspects of this disclosure relate to techniques for enabling an EES (i.e. an application function or mobile edge computing platform) to maintain a mapping between a UE IP address allocated by the 5GC and a NATed UE IP address allocated by a NAT function.

Thus, the EES may translate any request for a service provided by the 5GC with the NATed UE IP address, received from the application server, into a request for a service provided by the 5GC with the UE IP address allocated by the 5GC. The EES may send the request for a service provided by the 5GC with the UE IP address allocated by the 5GC to the 5GC instead of the request for a service provided by the 5GC with the NATed UE IP address.

One or more aspects of this disclosure relate to scenarios where the 5GC may not be aware of NAT being performed by a NAT function. The NAT function may be hosted at an edge network or hosted between the 5GC and an edge network, for example to avoid exposing external and/or internal IP addresses.

One or more aspects of this disclosure may be applicable to deployments where an private, an enterprise or a third party EAS is deployed within an edge network (e.g. public and/or private DN).

An application session may be established between an application client of a UE and the EAS. The application client of the UE may trigger an edge enabler client of the UE to send an application session identifier and a UE IP address allocated by the 5GC to an EES. The application client of the UE may trigger the edge enabler client of the UE over an edge-5 interface. The edge enabler client of the UE may send the application session identifier and the UE IP address allocated by the 5GC to the EES over an edge-1 interface.

The EAS may receive application data traffic from the application client of the UE. The EAS may receive the application session identifier and a NATed UE IP allocated by a NAT function. The EAS may send the application session identifier and the NATed UE IP allocated by the NAT function to the EES. The EAS may send the application session identifier and the NATed UE IP allocated by the NAT function to the EES over an edge-3 interface.

The EES may use the application session identifier to map the UE IP address allocated by the 5GC to the NATed UE IP allocated by the NAT function.

The EES may receive a request for a service provided by the 5GC from the EAS comprising the NATed UE IP allocated by the NAT function. The EES may receive the request for a service provided by the 5GC from the EAS comprising the NATed UE IP allocated by the NAT function over the edge-3 interface.

The EES may translate the request for a service provided by the 5GC comprising the NATed UE IP allocated by the NAT function into a request for a service provided by the 5GC comprising the UE IP allocated by the 5GC.

The EES may send the request for a service provided by the 5GC comprising the UE IP allocated by the 5GC to the 5GC. The EES may send the request for a service provided by the 5GC comprising the UE IP allocated by the 5GC to the 5GC over an edge-2 interface.

Figure 5:
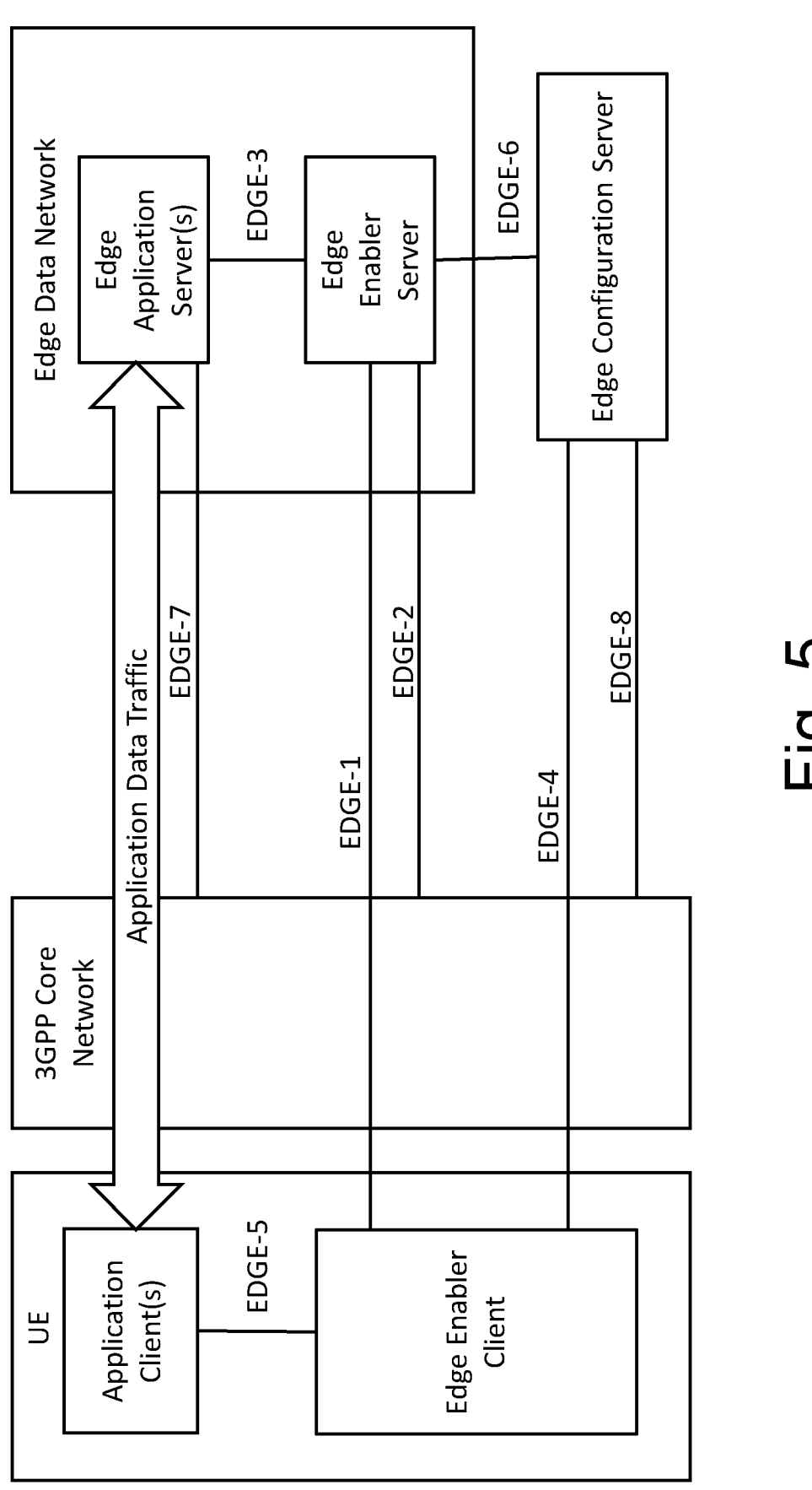
FIG. 5 shows a SA6 architecture (as per FIG. 6.2-4 of TS 23.558 v17.0.0)
Figure 6:
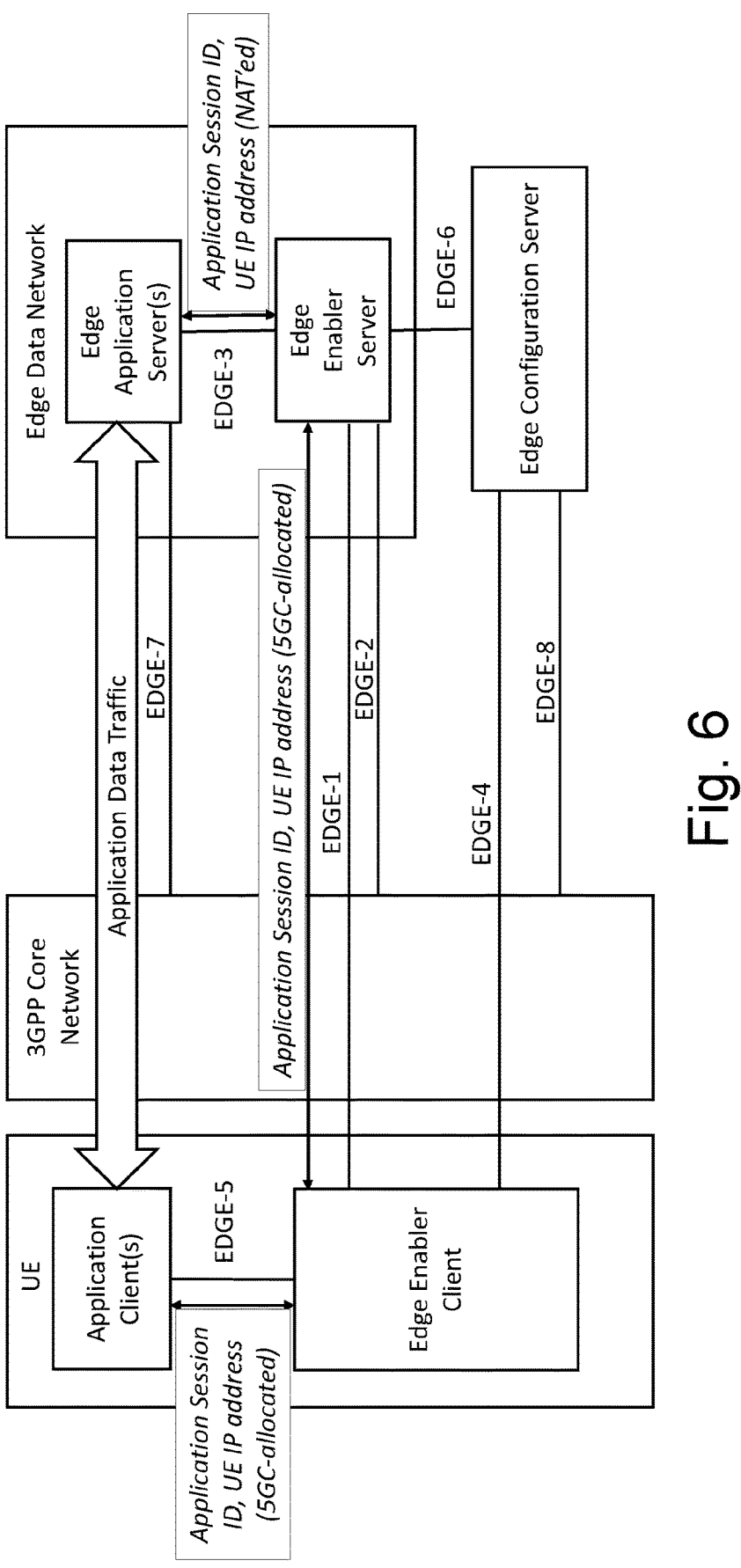
FIG. 6 shows a SA6 architecture with enhancements for enabling an edge enabler server to maintain mapping between a user equipment internet protocol address allocated by a 5GC and a user equipment internet protocol address allocated by a network address translation function.

FIG. 5 shows a SA6 architecture (as per FIG. 6.2-4 of TS 23.558 v17.0.0). Here, the edge network is a local DN. The EES and the EAS may be hosted within the edge network. An ECS may be hosted outside the edge network. The ECS may provide configurations related to the EES, including details of the edge network hosting the EES.

A UE may contain an application client and an edge enabler client.

The EES may provide supporting functions for the EAS and/or EEC. These supporting function may comprise provisioning configuration information to EEC, enabling exchange of application data traffic with the EAS, interacting with the 5GC for accessing the capabilities of network functions either directly (e.g. via PCF) or indirectly (e.g. via SCEF/NEF/SCEF+NEF) and/or supporting external exposure of the 5GC and service capabilities to the EAS over EDGE-3.

The edge enabler client of the UE may provide supporting functions for the application client of the UE. These supporting functions may comprise retrieval and provisioning of configuration information to enable the exchange of application data traffic with the EAS and/or discovery of the EAS in the EDN.

The ECS may provide supporting functions for the EEC to connect with an EES, These supporting functions may comprise interacting with the 5GC for accessing the capabilities of network functions either directly (e.g. via PCF) or indirectly (e.g. via SCEF/NEF/SCEF+NEF) and provisioning edge configuration information to the EEC to connect to the EES (e.g. EDN service area) and/or information for establishing a connection with EESs (such as uniform resource indicators).

One or more aspects of this disclosure enable MEC platform (ETSI MEC architecture) or EES (3GPP SA6 architecture as defined in the 3GPP TS 23.558) to maintain a mapping between a UE IP address allocated by the 5GC and a NATed UE IP address allocated by a NAT function.

One or more aspects of this disclosure provide enhancements to edge-1, edge-3 and edge-5 interfaces with corresponding messages. These enhancements are illustrated in FIG. 6. Possible enhancements relating to one embodiment are shown in italic.

Edge-1 to edge-9 interfaces may be specific to edge network deployments. Edge-1 to edge-9 interfaces may be specified in 3GPP TS 23.558 v17.0.0. One or more aspects of this disclosure work irrespective of number of NAT functions deployed in the path between the application client of the UE and EAS (including when an edge cloud implements NAT in conjunction with load balancing).

One or more aspects of this disclosure also work when the UE IP address allocated by the 5GC is changed due to UPF changes (e.g. in session and service continuity Mode 3).

FIG. 7 shows a signaling diagram illustrating a process for enabling an EES to maintain mapping between a UE IP address allocated by a 5GC ("UE IP address (5GC-allocated)") and a NAT'ed UE IP allocated by a NAT function ("UE IP address (NAT'ed)").

In step 1, an application session may be established between an application client (AC) of a UE and the EAS. The EAS may be hosted within an edge network. The EAS may be a private, enterprise or third party deployed EAS. A NAT function may be hosted within the edge network or hosted between the 5GC and the edge network. In this way, UE IP address allocated by the 5GC may be translated into a NATed UE IP address allocated by the NAT function in the uplink direction. The NATed UE IP address allocated by the NAT function may be translated into a UE IP address allocated by the 5GC in the downlink direction. The EAS may allocate an "application session identifier" ("Application Session ID") for the established application session. The application session identifier may be a unique identifier. The application session identifier may comprise an application identifier and a session identifier. The EAS may send the application session identifier to the application or application client of the UE.

In step 2, the application client of the UE may trigger an edge enabler client (EEC) of the UE to send the application session identifier and the UE IP address allocated by the 5GC to an EES (e.g. trigger an Application Client Session Info Message). The application client of the UE may trigger the edge enabler client of the UE over an edge-5 interface.

In step 3, the edge enabler client of the UE may send the application session identifier and the UE IP address allocated by the 5GC to the EES over an edge-1 interface. The UE may send the application session identifier and the UE IP address allocated by the 5GC using an Application Client Session Info Message.

In step 4, the EAS may receive application data traffic from the application client of the UE. The EAS may receive the application session identifier and a NATed UE IP allocated by a NAT function. The EAS may send the application session identifier and the NATed UE IP allocated by the NAT function to the EES (e.g. Application Server Session Info Message). The EAS may send the application session identifier and the NATed UE IP allocated by the NAT function to the EES over an edge-3 interface.

In step 5, the EES may use the application session identifier(s) to map the UE IP address allocated by the 5GC to the NATed UE IP allocated by the NAT function. The EES may store the mapping in a mapping table. The mapping table may store multiple mappings of UE IP addresses allocated by a 5GC mapping to NATed UE IP addresses allocated by a NAT function.

In step 6, the EES may receive a request for a service provided by the 5GC (e.g. NEF) from the EAS comprising the NATed UE IP allocated by the NAT function. The EES may receive the request for a service provided by the 5GC from the EAS comprising the NATed UE IP allocated by the NAT function over the edge-3 interface. The EES may translate the request for a service provided by the 5GC comprising the NATed UE IP allocated by the NAT function into a request for a service provided by the 5GC comprising the UE IP allocated by the 5GC. The EES may use the mapping table maintained at the EES for the translation.

In step 7, the EES may send the request for a service provided by the 5GC comprising the UE IP allocated by the 5GC to the 5GC. The EES may send the request for a service provided by the 5GC comprising the UE IP allocated by the 5GC to the 5GC over an edge-2 interface.

The steps of the process as shown in FIG. 7 do not necessarily have to be performed in the shown order. For example, the EAS may send its Application Server Session Info Message to the EES (see step 4) anytime when the EAS has the information on the application session identifier and the UE IP address (NAT'ed), possibly when e.g. an internal trigger is received. This means, the Application Server Session Info Message from the EAS to the EES may also be sent before the Application Server Session Info Message from the EEC to the EES is sent. Further, also e.g. the request for a service provided by the 5GC sent from the EAS to the EES (see step 6) may be sent anytime as the UE IP address (NAT'ed) is used which is known to both entities.

Figure 8:
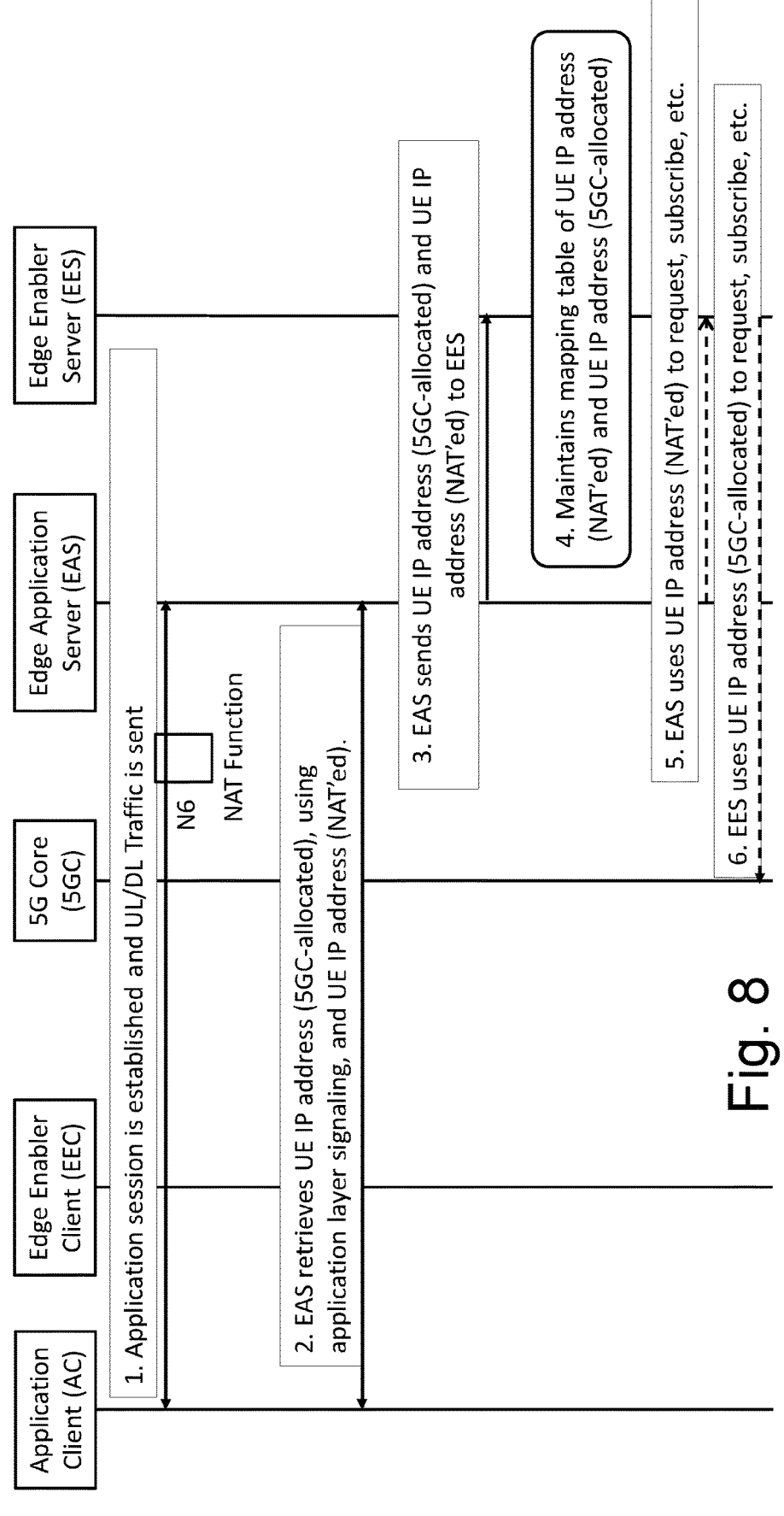
FIG. 8 shows another signaling diagram illustrating a process for enabling an edge enabler server to maintain mapping between a user equipment internet protocol address allocated by a 5GC and a network address translated user equipment internet protocol address allocated by a network address translation function.

FIG. 8 shows another signaling diagram illustrating a process for enabling an EES to maintain mapping between a UE IP address allocated by a 5GC and a NATed UE IP allocated by a NAT function.

This signaling diagram allows scenarios where the application client of the UE and the EAS allow the EAS to receive the UE IP address allocated by the 5GC via dedicated application level signaling. This could be based on IETF RFC 6314.

In step 1, an application session may be established between an application client of a UE and the EAS. The EAS may be hosted within an edge network. The EAS may be a private, enterprise or third party deployed EAS. A NAT function may be hosted within the edge network or hosted between the 5GC and the edge network. In this way, UE IP address allocated by the 5GC may be translated into a NATed UE IP address allocated by the NAT function in the uplink direction. The NATed UE IP address allocated by the NAT function may be translated into a UE IP address allocated by the 5GC in the downlink direction. The EAS may optionally allocate an application session identifier ("Application Session ID") for the established application session. The application session identifier may be a unique identifier. The application session identifier may comprise an application identifier and a session identifier. The EAS may send the application session identifier to the application or the application client of the UE.

In step 2, the application client of the UE may send the UE IP address allocated by the 5GC to the EAS. The application client of the UE may send the UE IP address allocated by the 5GC via dedicated application level signaling, for example based on IETF RFC 6314. The application client of the UE may include the application session identifier in the application level signaling—if an application session identifier was received. The EAS may retrieve the UE IP address allocated by the NAT function via conventional means. For example, the EAS "knows" about the UE IP address allocated by the NAT function from the established application session. The UE IP address visible for the EAS from the established application session is the UE IP address NATed by the NAT function.

In step 3, the EAS may send both, the UE IP address allocated by the 5GC and the NATed UE IP address allocated by the NAT function, to the EES (e.g. Application Server Session Info Message). The EAS may mark both, the UE IP address allocated by the 5GC and the NATed UE IP address allocated by the NAT function, as associated, i.e. as belonging to the same UE. The EAS may send both, the UE IP address allocated by the 5GC and the NATed UE IP address allocated by the NAT function, over an edge-3 interface. If an application session identifier was received, the EAS may use the application session identifier(s) to map the UE IP address allocated by the 5GC to the NATed UE IP allocated by the NAT function, and then send both, the UE IP address allocated by the 5GC and the NATed UE IP address allocated by the NAT function, together in one Application Server Session Info Message. The EAS may also send each, the UE IP address allocated by the 5GC and the NATed UE IP address allocated by the NAT function, together with the application session identifier.

In step 4, the EES may map the UE IP address allocated by the 5GC to the NATed UE IP allocated by the NAT function. Mapping may be based on a UE IP address allocated by the 5GC and a NATed UE IP address allocated by the NAT function that were marked as associated and/or belonging to the same UE (for example, mapping was done by the EAS) or that were received together, e.g. in the same Application Server Session Info Message from the EAS. Mapping may also be performed by the EES based e.g. on the application session identifier. The EES may store the mapping in a mapping table. The mapping table may store multiple mappings of UE IP addresses allocated by a 5GC mapping to NATed UE IP addresses allocated by a NAT function.

In step 5, the EES may receive a request for a service provided by the 5GC (e.g. NEF) from the EAS comprising the NATed UE IP allocated by the NAT function. The EES may receive the request for a service provided by the 5GC from the EAS comprising the NATed UE IP allocated by the NAT function over the edge-3 interface. The EES may translate the request for a service provided by the 5GC comprising the NATed UE IP allocated by the NAT function into a request for a service provided by the 5GC comprising the UE IP allocated by the 5GC. The EES may use the mapping table maintained at the EES for the translation.

In step 6, the EES may send the request for a service provided by the 5GC comprising the UE IP allocated by the 5GC to the 5GC. The EES may send the request for a service provided by the 5GC comprising the UE IP allocated by the 5GC to the 5GC over an edge-2 interface.

The steps of the process as shown in FIG. 8 do not necessarily have to be performed in the shown order. For example, the request for a service provided by the 5GC sent from the EAS to the EES (see step 6) may be sent anytime as the UE IP address (NAT'ed) is used which is known to both entities.

Figure 9:
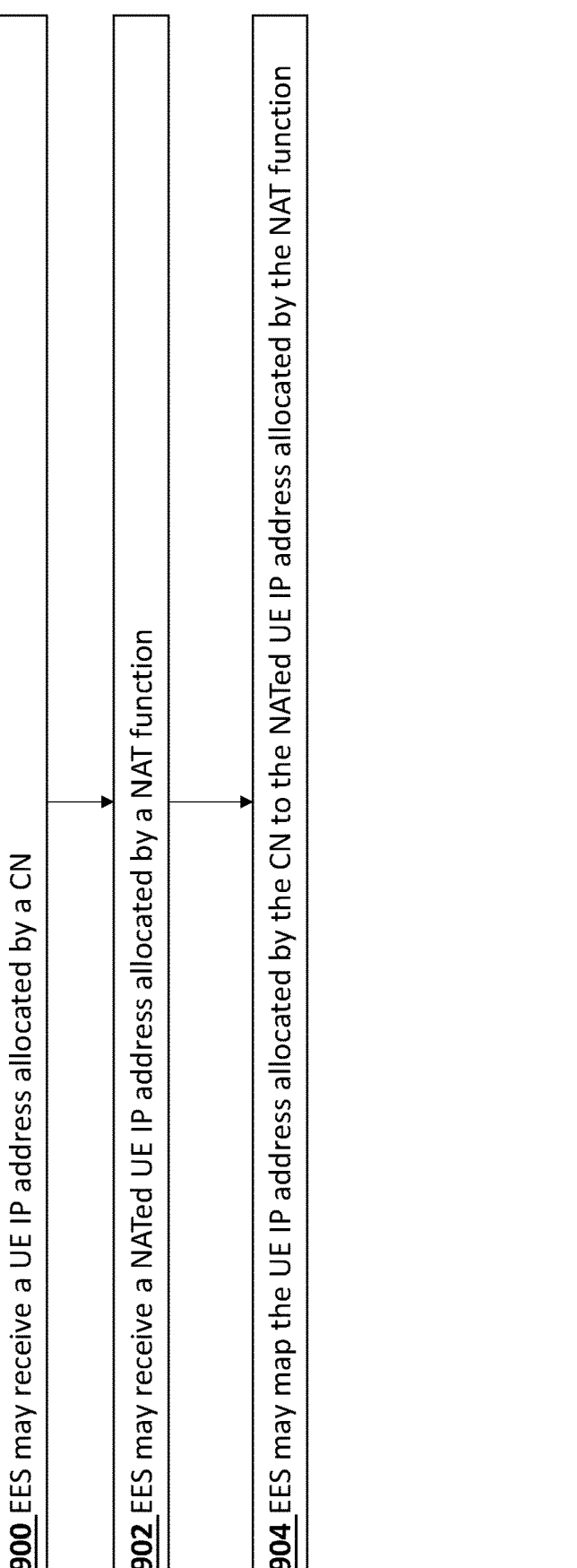
FIG. 9 shows a block diagram of a method for enabling an edge enabler server to maintain mapping between a user equipment internet protocol address allocated by a 5GC and a network address translated user equipment internet protocol address allocated by a network address translation function performed by an edge enabler server.

FIG. 9 shows a block diagram of a method for enabling an EES to maintain mapping between a UE IP address allocated by a 5GC and a NATed UE IP address allocated by a NAT function. The method may be performed by an EES.

In step 900 the EES may receive a UE IP address allocated by a CN.

In step 902 the EES may receive a NATed UE IP address allocated by a NAT function.

In step 904 the EES may map the UE IP address allocated by the CN to the NATed UE IP address allocated by the NAT function.

The NAT function may be hosted by an edge network or hosted between the CN and an edge network.

The EES may receive, from the UE, an application session ID with the UE IP allocated by the CN. The EAS may receive, from an EAS, the application session ID with the NATed UE IP address allocated by the NAT function.

The application session ID and the UE IP address allocated by the CN may be received over an edge-1 interface.

The application session ID and the NATed UE IP address allocated by the NAT function may be received over an edge-3 interface.

The EES may receive, from an EAS, the UE IP address allocated by a core network with the NATed UE IP address allocated by the NAT function.

The UE IP address allocated by the CN with the NATed UE IP address allocated by the NAT may be received over an edge-3 interface.

The EES may receive a request for a service provided by the CN, from the EAS, comprising the NATed UE IP address allocated by the NAT function. The EES may translate the request for a service provided by the CN comprising the NATed UE IP address allocated by the NAT function into a request for the service provided by the CN comprising the UE IP address allocated by the CN. The EES may send, to the CN, the request for the service provided by the CN comprising the UE IP address allocated by the CN.

The request comprising the UE IP address allocated by the CN may be sent over an edge-2 interface.

Figure 10:
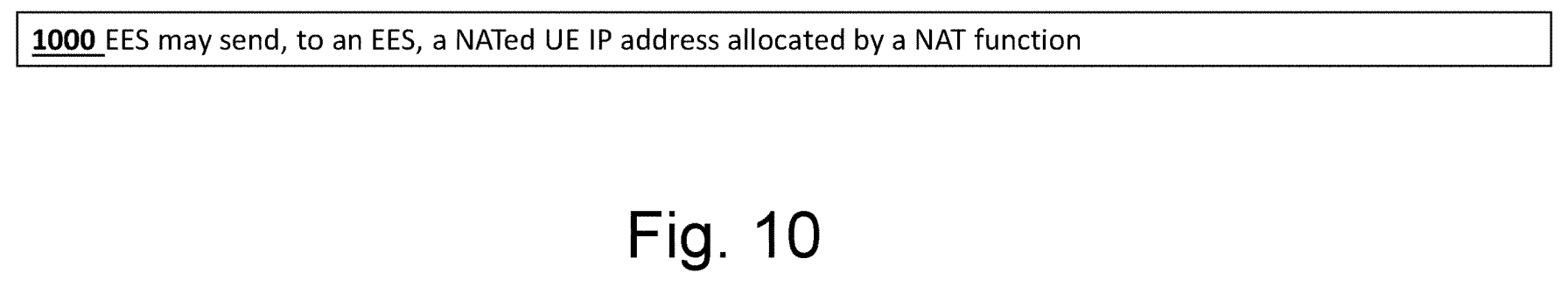

FIG. 10 shows a block diagram of a method for enabling an EES to maintain mapping between a UE IP address allocated by a 5GC and a NATed UE IP address allocated by a NAT function. The method may be performed by an EAS.

The EAS may send, to an EES, a UE IP address allocated by a NAT function.

The NATed UE IP address allocated by the NAT function may be sent with a UE IP address allocated by a CN.

The NATed UE UP address allocated by the NAT function is sent with a UE IP address allocated by a CN over an edge-3 interface.

The EAS may receive, from the UE, the NATed UE IP address allocated by the NAT function and the UE IP address allocated by the CN.

The NATed UE IP address allocated by the NAT function may be received over a dedicated application layer signalling.

The NATed UE IP address allocated by the NAT function may be sent with an application session ID.

The NATed UE IP address allocated by the NAT function may be sent with an application session ID over an edge-3 interface.

The EAS may send a request for a service provided by the CN, to the EES, comprising the NATed UE IP address allocated by the NAT function.

Figure 11:
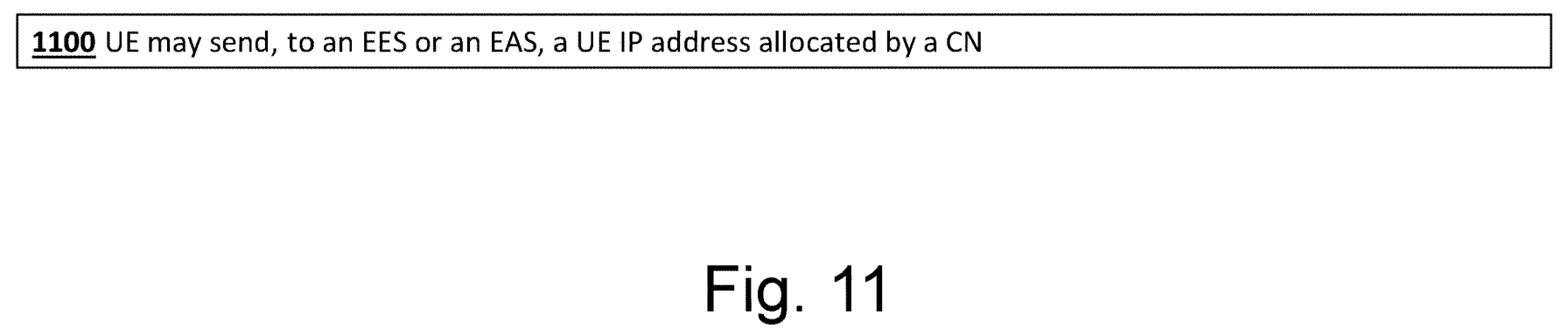

FIG. 11 shows a block diagram of a method for enabling an EES to maintain mapping between a UE IP address allocated by a 5GC and a NATed UE IP address allocated by a NAT function. The method may be performed by a UE.

The UE may send, to an EAS or an EES, a UE IP address allocated by a CN.

The UE may send, to an EES, the UE IP address allocated by the CN with an application session ID.

The UE may comprise an application client and an edge enabler client. Sending the UE IP address allocated by the CN with an application session ID may comprise: sending, by the application client to the edge enabler client, an instruction to send the UE IP address allocated by the CN with the application session ID; and sending, by the edge enabler client to the EES, the UE IP address allocated by the CN with the application session ID.

Figure 12:
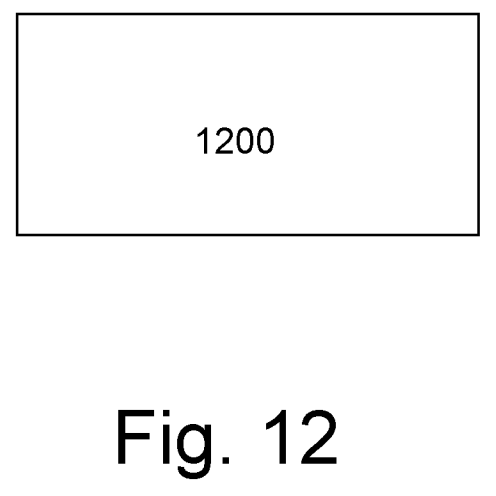

FIG. 12 shows a schematic representation of non-volatile memory media 1200 storing instructions and/or parameters which when executed by a processor allow the processor to perform one or more of the steps of the methods of FIGS. 9 to 11.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 9 and 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising at least one processor and at least one memory including computer code for one or more programs, the at least one memory and the computer code configured, with the at least one processor, to cause the apparatus at least to:

receive a user equipment internet protocol address allocated by a core network;

receive a network address translated user equipment internet protocol address allocated by a network address translation function;

map the user equipment internet protocol address allocated by the core network to the network address translated user equipment internet protocol address allocated by the network address translation function;

receive, from the user equipment, an application session identifier with the user equipment internet protocol address allocated by the core network;

receive, from an edge application server, the application session identifier with the network address translated user equipment internet protocol address allocated by the network address translation function;

receive, from an edge application server, the user equipment internet protocol address allocated by a core network with the network address translated user equipment internet protocol address allocated by the network address translation function;

receive a request for a service provided by the core network, from the edge application server, comprising the network address translated user equipment internet protocol address allocated by the network address translation function;

translate the request for a service provided by the core network comprising the network address translated user equipment internet protocol address allocated by the network address translation function into a request for the service provided by the core network comprising the user equipment internet protocol address allocated by the core network; and send, to the core network, the request for the service provided by the core network comprising the user equipment internet protocol address allocated by the core network, wherein the network address translation function is hosted by an edge network, wherein the application session identifier and the user equipment internet protocol address allocated by the core network are received over an edge-1 interface, wherein the application session identifier and the network address translated user equipment internet protocol address allocated by the network address translation function are received over an edge-3 interface, wherein the user equipment internet protocol address allocated by the core network with the network address translated user equipment internet protocol address allocated by the network address translation function are received over an edge-3 interface, and wherein the request comprising the user equipment internet protocol address allocated by the core network is sent over an edge-2 interface, wherein the application session identifier correlates the user equipment internet protocol address allocated by the core network with the network address translated internet protocol address allocated by the network address translation function.

* * * * *